Jan. 31, 1933.  S. RUBEN  1,895,686
ELECTRIC CURRENT RECTIFIER
Filed June 4, 1931
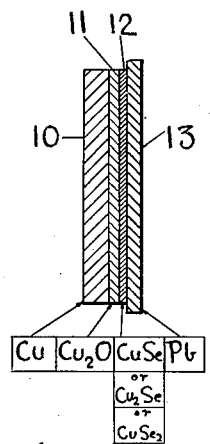
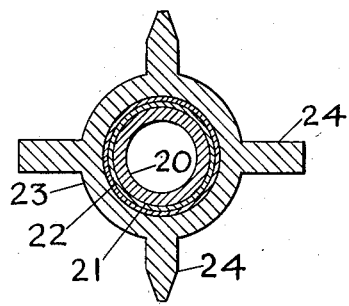
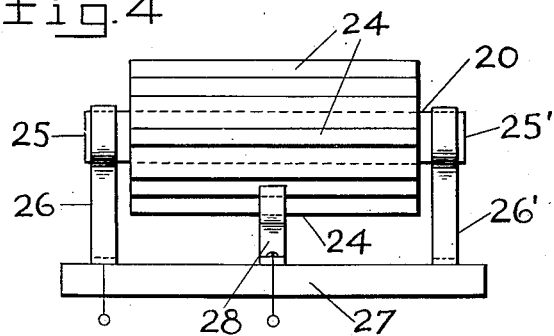
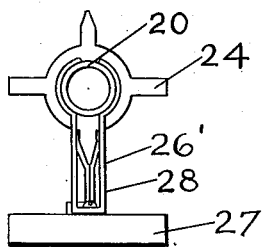
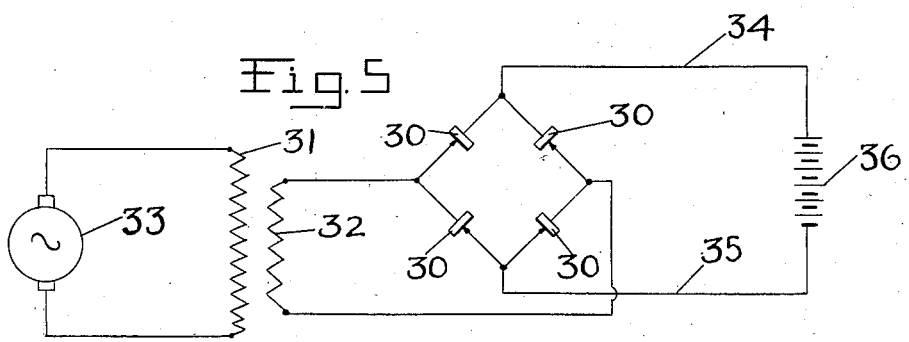
INVENTOR
BY Samuel Ruben
Watson, Bristol, Johnson & Leavenworth
ATTORNEY Patented Jan. 31, 1933

1,895,686

UNITED STATES PATENT OFFICE

SAMUEL RUBEN, OF NEW ROCHELLE, NEW YORK, ASSIGNOR TO RUBEN RECTIFIER CORPORATION, OF ENGLEWOOD, NEW JERSEY, A CORPORATION OF DELAWARE

ELECTRIC CURRENT RECTIFIER

Application filed June 4, 1931. Serial No. 542,001.

This invention relates to electric current rectifiers and the like which employ electrode elements of the dry type, and more particularly to rectifiers of this character which employ electrode elements having a preformed rectifying junction between its metal base and an adhering compound thereof.

Rectifiers of this type are known in which the electrode elements are composite bodies of a highly conducting metal, such as, for example, silver, tantalum and copper, coated with an adhering body of oxide in a manner which develops a rectifying junction at the metallic surface that is overlaid by the compound. Such rectifiers depend for their operation upon the asymmetric resistance characteristics which obtain at this junction.

A general object of the invention is the provision of an improved device of the character indicated which is more efficient, has a lower specific resistance, longer service life, better operating characteristics and is more stable under higher temperatures than devices of this type known to the prior art.

A more specific object of the invention is the provision of an improved device of the character indicated in which an electrode is coated with an oxide with which is intimately joined a compound of a metal such that the unit is capable of withstanding higher operating potentials with a more uniform distribution of current at the rectifying junction, is efficiently operable at higher currents and temperatures and in a greater range of differences in impressed potential, and has a lower specific resistance and a longer service life than the rectifying electrodes of similar devices known prior to the present invention.

Other objects of the invention will in part be obvious and will in part appear hereinafter.

The invention accordingly comprises the features of construction combination of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawing, in which:

Fig. 1 is a cross sectional view of an electrode element of the present invention enlarged to show schematically the component parts thereof;

Fig. 2 is a sectional view of a convenient embodiment of a rectifying device constructed in accordance with the present invention;

Fig. 3 is an end elevation, showing the same mounted on a suitable support or base;

Fig. 4 shows the rectifying element and base in side elevation; and

Fig. 5 shows schematically an electrical system in which the rectifier of the present invention is arranged for effecting full wave rectification.

This case is a continuation, in part, of my copending applications, Serial No. 283,217, filed December 6, 1927; Serial No. 323,084, filed December 1, 1928; and Serial No. 407,777, filed November 16, 1929.

Prior to the present invention dry rectifiers including a rectifying electrode of a metal, such as, for example, copper having a layer of a compound of the metal, such as, for example, cuprous oxide to form between the layer and the base of the electrode a rectifying junction, have been well known. Additional layers of compounds of the metal, such as, for example, a sulphide of copper, have likewise been suggested to provide an additional rectifying junction.

The present invention is a specific improvement in dry rectifiers of the latter type which can be easily carried out to obtain devices having desirable operating characteristics and efficiencies heretofore unattainable.

Referring to the drawing like numerals indicate like parts throughout. In Fig. 1 a metallic base 10 of a highly conducting metal, such as, for example, silver, tantalum, or copper having a surface coated with a layer 11 of an oxygen compound of the metal selected for the base. In the approved form copper is preferred because of its relatively low cost. In that case the oxygen compound may be, for example, cuprous oxide ($Cu_2O$). This compound may be on more than one surface, but for the purpose of the present invention the one surface which is actively employed in rectification is all that is shown as having this coating. Overlying or superposed upon this coating and in intimate contact therewith is a thin layer of a second compound shown at 12, of an element heavier than oxygen, adapted to react by substitution with the oxygen compound in case of undue heating, or breakdown. A suitable stable compound of this character is a metallic compound with an element of the sulphur family, for example, a sulphide, selenide, or telluride. In the preferred form this compound may be, for example, a selenide of copper, although a telluride of copper may be used to advantage.

Against the surface of the second or reacting compound is pressed a plate of relatively inert metal 13, which is provided to make good electrical contact with the second compound. Such metal may be of lead, tin, or an alloy thereof. Lead, however, is preferred and its presence is indicated in the preferred embodiment shown in Fig. 1 by the legend imposed.

The layer of reacting compound in accordance with the present invention, is made to have a very intimate contact with the underlying layer, which is achieved through the agency of chemical union. Where this reacting layer is cupric selenide, this is brought about for example, by compounding cupric selenide with gum arabic and coating the oxide layer with this mixture. In order to effect the desired intimate union between the layers of cupric selenide and cuprous oxide, the copper body with the two layers is heated to a temperature sufficient to effect the union, such as, about 120° C. This produces a surface reaction between the selenide and oxide. As a result, it can be noted that a very thin layer of a substitution compound is formed having a thickness approximating one-thousandth of an inch. Since the surface of the oxide is slightly selenided, as shown by examination, the contact resistance, which obtains at the junction of the layers of oxide and of selenide, is reduced materially if not completely eliminated and is of a character such that the application of pressure to the element no longer changes its resistance characteristics. The compound electrode element thus produced may be assembled in rectifiers without special regard to operating pressure, all that is required being a good contact.

Compound rectifying electrodes produced in this manner also have substantially uniform distribution characteristics for the current over the surface at the junction, which is unobtainable with metal contacting with the oxide because the contact resistance between metal and the oxide varies with the pressure applied and with the contact area. Consequently, uniform current densities are readily obtained in practice by the use of the present invention and the tendency for the current to localize over the surface is substantially avoided. The intimate union between the selenide and the oxide layers also results in changing the voltage characteristics of the electrode from that of a plain copper-oxide-coated electrode to have operating characteristics substantially non-critical to the voltage and whereby such electrodes operate over a relatively wide range of voltage. Higher impressed operating voltages as a consequence may be employed.

The rectifying elements of the present invention are highly resistant to the destructive effects of relatively high potential and temperature. A selenide has a very low affinity for cuprous oxide, and specifically, much lower than the affinity of a sulphide for cuprous oxide. The units can thus be operated at the maximum temperature and potential that the cuprous oxide will stand without any possibility of a reduction in efficiency of the units due to a seleniding of the cuprous oxide-copper junction.

In dry rectifying electrodes where a copper base is used coated with cuprous oxide the current tends to localize due to the relatively poor contact and consequent relatively high resistance between the cuprous oxide and the inert metal. This results in an increase in current densities at the localized areas of contact through which the current is conducted. When the current density reaches a critical value, the cuprous oxide film breaks down resulting in a short circuit of the rectifying device. When a selenide coating is used the current is evenly distributed, due to the low specific resistance of the selenide, thus avoiding localization and any resulting break-down of the cuprous oxide film. Should, however, the current density reach a critical value such that the selenide coating is transformed at certain places to selenium no harmful short circuit results since selenium does not act with the copper, due to their different characteristics, to give a short circuit. This action may be termed self-sealing.

It has been found that the use of cuprous selenide or of a telluride of copper in lieu of the cupric selenide also gives beneficial and desirable results. Since the use of cuprous selenide gives a slightly higher resistance to the electrode unit than does cupric selenide the latter is preferred. These additional compounds are useful since they like cupric selenide exhibit less affinity for cuprous oxide than does a sulphide of copper. This feature is primarily the basis for the improved operating characteristics of the units made in accordance with the present invention.

The improved operating characteristics provided by the rectifying electrode of the present invention thus adapt it for normal operation at relatively high voltages and at relatively high current densities. To adapt electrodes of the present invention more specifically to withstand operation at high current densities, the electrode elements are preferably given a physical form which have relatively high heat radiation characteristics. A suitable physical form for this purpose is illustrated in Figs. 2, 3 and 4, where it is seen that the base plate of copper, shown at 20, is made into tubular form, the coatings being placed on the outer side, the cuprous oxide coating being indicated at 21; the cupric selenide layer being indicated at 22. The backing of inert metal is shown at 23 and forms the outermost cylindrical envelope; this envelope being provided with a plurality of radially extending heat radiating fins 24.

A compound rectifying electrode having such physical form, is readily mounted for rectifying service by prolonging the ends of the copper tube beyond the ends of the inert metallic envelope, so that they may be used both as terminals and as supports for the compound electrode. An arrangement for this purpose is shown in Fig. 4, where 25 and 25' denote projecting ends of the copper tube which are supported respectively in clip-like brackets 26 and 26', the latter being secured on an insulating base 27. This insulating base also has a central clip-like bracket 28 disposed to engage with one or more fins 24 of the inert metallic tube. The bracket 28 and the end supporting bracket are thus adapted to serve as terminals for the present rectifying electrode, for example, those shown at 27 and 28. Such a rectifying electrode is adapted to be connected in any convenient electrical system arranged to supply rectified current, for example in a bridge-circuit as shown in Fig. 5 where the rectifying cells are symbolically depicted at 30 as disposed respectively in the four arms of a Wheatstone bridge adapted to supply full-wave rectified current. Across one diagonal of this bridge is impressed an alternating current supply, here indicated as the secondary 32 of a transformer whose primary is shown at 31; this latter being supplied by alternating current from any convenient commercial source, such as a 110-volt-60-cycle source, symbolically depicted at 33. Across the other diagonal of the bridge is connected the direct current supply circuit comprising conductors 34 and 35 leading to a current consuming device 36.

In operation, where the electrode elements, depicted at 30, are of the character shown in Figs. 3 and 4, then the direct current obtained may be of relatively high voltage and at a relatively high current density. The device may be turned off and on at will without interfering at all with the operating characteristics, the heat generated being readily dissipated through the fins here provided. The rectifying device will operate substantially free from the possibility of short circuits and substantially unimpaired if subjected to short circuits or similar transients, by reason of the self-sealing characteristics hereby imparted.

Any convenient process for manufacturing the compound rectifying electrodes of the present invention may be employed which provides intimate union between the outer layer and the subjacent layer of cuprous oxide. The following, however, is preferred, since it results in a copper plate to which the cuprous oxide is also intimately joined.

A copper plate or base of a shape suitable for the electrode is cleaned and then exposed for a short period to the vapors of sulphur, so as to be thinly coated with a layer of sulphide. The base thus slightly sulphided is then placed in a furnace and surrounded with an oxidizing atmosphere and heated to substantially 1000° C. for a period depending upon the thickness of the oxide layer which is desired to produce, for example, a period of 20 minutes where it is desired to produce an oxide layer of about 5 mils in thickness. When thus oxidized, the base is taken from the furnace and quenched in a 25 per cent solution of hydrochloric acid. This quenching produces a substantially uniformly distributed layer of crystals over the surface of the copper, the outermost layer being crystals of cupric oxide, while that beneath is a relatively thick layer of cuprous oxide crystals. In order to remove the outermost layer of oxide, the coated copper base is then treated for a short time in nitric acid. This removes the cupric oxide and leaves a surface which may be readily coated with cupric selenide material in a manner so as to be intimately joined to the underlying layer. A preferred method for accomplishing this latter, is as follows:

Copper selenide powder is first prepared by mixing together copper powder and powdered selenium. This is then heated to a temperature sufficient to convert the mixture to cupric selenide, after which it is finely ground to pass through a screen of 200 mesh or finer. The product thus obtained may be added to a solution of gum arabic and the resulting mixture applied as a coating to the oxide coated base in any convenient manner, such as, for example, by means of a brush. However, any approved method other than that set forth above may be followed to obtain a selenide coating on the electrode. The body thus coated is then heated to intimately join the selenide layer with the oxide layer. This intimate union is believed to be obtained by a chemical reaction between the selenide layer and the oxide layer during the heating. The temperature for this reaction is about 120° C. as indicated above.

Where the electrode element is in tubular form the backing of inert metal is fitted about the same in any convenient manner adapted to produce a good contact, for example, cast on the same. This form is preferred where the electrode elements have the form illustrated in Figs. 2, 3 and 4 of the drawing, since it insures good contact both initially and during operation.

When a telluride of copper is used in lieu of cupric selenide the compound may be formed in a similar manner and the electrode coated therewith by a similar method.

Dry rectifier electrodes made in accordance with the disclosure of my copending application Serial No. 407,777, filed November 16, 1929, have been greatly improved by applying a selenide layer over the sulphide layer. A copper base having a cuprous oxide coating may first be sulphided, as for example, by exposure to vapors of ammonium sulphide or hydrosulphuric acid after which it is coated with a finely ground layer of cupric selenide, cuprous selenide or other selenides of copper. The coated electrode is then heated and reacted to intimately join the layers. This treatment increases the efficiency of such an electrode, prolongs the service life and tends to prevent break-down due to a progressive deterioration of the cuprous oxide because of an affinity of the sulphide for the cuprous oxide.

It will thus be seen that in accordance with the present invention dry rectifier electrodes have been produced which efficiently attain the objects set forth above.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent, is:

1. In dry rectifiers and the like, a composite electrode element comprising a body including a metallic base and an adhering oxide layer of the same metal from which the base is formed and adapted to provide a rectifying junction at the contacting surface with said metallic base, and a layer of metallic selenide superposed upon said body.

2. In dry rectifiers and the like, a composite electrode comprising a base of copper having an adhering layer of cuprous oxide, and an intimately joined layer of a compound of the sulphur family overlying said cuprous oxide layer, said compound of the sulphur family group having an affinity for the cuprous oxide less than that of a sulphide of copper.

3. In dry rectifiers and the like, a composite electrode element comprising a body including a base of copper and an adhering layer of cuprous oxide, and a layer of selenide of copper superposed upon said body.

4. In dry rectifiers and the like, a composite electrode element comprising a body of copper having an adhering layer of cuprous oxide, and a layer of a selenide of copper intimately joined to the layer of cuprous oxide over the active surface of the latter.

5. In dry rectifiers and the like, a composite electrode element comprising a body of copper having an adhering layer of cuprous oxide, and a layer of a compound of one of the elements selenium and tellurium overlying the active surface of said cuprous oxide layer and joined thereto by intersurface chemical union.

6. In dry rectifiers and the like, a composite electrode element comprising a body of copper having an adhering layer of cuprous oxide, and an intimately joined layer of cupric selenide overlying said cuprous oxide layer.

7. In dry rectifiers and the like, a composite electrode element comprising a body of copper having an adhering layer of cuprous oxide, and an intimately joined layer of cuprous selenide overlying said cuprous oxide layer.

8. In dry rectifiers and the like, a composite electrode comprising a body including a base of copper having an adhering layer of cuprous oxide and an intimately joined layer of a sulphide of copper overlying said cuprous oxide layer, and a layer of a selenide of copper superposed upon said body.

9. In dry rectifiers and the like, a composite electrode comprising a body including a base of copper having an adhering layer of cuprous oxide and an intimately joined layer of cupric sulphide overlying said cuprous oxide layer, and a layer of cupric selenide superposed upon said body.

10. A process of producing a copper oxide rectifying electrode which comprises heating a body of clean copper in an oxidizing atmosphere at 1000° C. for a period sufficient to produce an oxide layer of desired thickness, quenching in a 25 per cent solution of hydrochloric acid, and thereafter removing the exterior coating of cupric oxide from the cuprous oxide, surfacing the latter with a layer of a reacting compound of an element of the sulphur family, said reacting compound having an affinity for the cuprous oxide less than that of a sulphide of copper, and inducing an intimate union between said layers whereby the contact resistance thereat is substantially reduced.

11. A process of producing a copper oxide rectifying electrode which comprises heating a body of clean copper in an oxidizing atmosphere at 1000° C. for a period sufficient to produce an oxide layer of desired thickness, quenching in a 25 per cent solution of hydrochloric acid, and thereafter removing the exterior coating of cupric oxide from the cuprous oxide, surfacing the latter with a layer of a reacting compound of a selenide of copper, and inducing an intimate union between said layers whereby the contact resistance thereat is substantially reduced.

12. A process of producing a copper oxide coated rectifying electrode which comprises heating a body of clean copper in an oxidizing atmosphere at 1000° C. for a period sufficient to produce an oxide layer of desired thickness, quenching in a 25 per cent solution of hydrochloric acid, and thereafter removing the exterior coating of cupric oxide from the cuprous oxide, surfacing the latter with a layer of a reacting compound of one of the elements selenium and tellurium, and inducing an intersurface chemical union between said layers.

In testimony whereof I affix my signature.

SAMUEL RUBEN.